US010641228B2

(12) United States Patent
Siddiqui et al.

(10) Patent No.: US 10,641,228 B2
(45) Date of Patent: May 5, 2020

(54) METHODS AND SYSTEMS FOR ENABLING ENGINE START/STOP FUNCTION

(71) Applicant: Ford Global Technologies, LLC, Dearborn, MI (US)

(72) Inventors: Siraj Siddiqui, Lasalle (CA); Hank Kwong, Farmington Hills, MI (US); Eric Rademacher, Beverly Hills, MI (US); Ahmed Awadi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/948,313

(22) Filed: Apr. 9, 2018

(65) Prior Publication Data

US 2019/0309721 A1    Oct. 10, 2019

(51) Int. Cl.
*F02N 11/08* (2006.01)

(52) U.S. Cl.
CPC ........ *F02N 11/084* (2013.01); *F02N 11/0814* (2013.01); *F02N 11/0822* (2013.01); *F02N 11/0844* (2013.01); *F02N 2200/0815* (2013.01); *F02N 2200/102* (2013.01); *F02N 2200/103* (2013.01)

(58) Field of Classification Search
CPC ............... F02N 11/0814; F02N 11/084; F02N 11/0844; F02N 11/0822; F02N 2200/0815; F02N 2200/102; F02N 2200/103

USPC ........................................ 701/113; 123/179.4
See application file for complete search history.

(56) References Cited

U.S. PATENT DOCUMENTS

| 3,858,175 | A | * | 12/1974 | Kopera, Jr. | ......... B60R 25/1001 340/426.25 |
| 7,890,243 | B2 | | 2/2011 | Abendroth | |
| 2012/0138006 | A1 | | 6/2012 | Gwon et al. | |
| 2014/0081561 | A1 | * | 3/2014 | Be | ...................... B60W 50/085 701/112 |
| 2017/0028966 | A1 | | 2/2017 | Elie et al. | |
| 2018/0328330 | A1 | * | 11/2018 | Terahata | ............... F02N 11/084 |

FOREIGN PATENT DOCUMENTS

DE            10211466 C1 *  8/2003    ............. B60K 28/12

OTHER PUBLICATIONS

DE 10211466 C1 (Schorpp et al.) Aug. 28, 2003 (Machine Translation). [online] [retrieved on Sep. 18, 2019]. Retrieved from Espacenet.*

* cited by examiner

*Primary Examiner* — Mahmoud Gimie
(74) *Attorney, Agent, or Firm* — Geoffrey Brumbaugh; McCoy Russell LLP

(57) ABSTRACT

Methods and systems are provided for enabling engine start/stop function in a vehicle with a detachable door. In one example, a method may include, adjusting an engine start/stop strategy responsive to a driver side door of the vehicle been detected to be absent. The adjustment to the start/stop strategy further may be modified based on a type of transmission system coupled to the vehicle.

20 Claims, 5 Drawing Sheets

METHODS AND SYSTEMS FOR ENABLING ENGINE START/STOP FUNCTION

FIELD

The present description relates generally to methods and systems for adjusting engine start/stop function in a vehicle with detachable door.

BACKGROUND/SUMMARY

During intermediate vehicle stops such as at a traffic light, an engine may idle for some time. In order to increase fuel efficiency and improve emissions quality, the vehicle engine may be equipped with a start/stop function to reduce prolonged idling by temporarily shutting down the engine and then restarting the engine when restart conditions are met. The engine start/stop function may be carried out in the presence of a vehicle operator in order to ensure that the engine is not stopped without indication from the operator. By enabling the start/stop function in the presence of an operator, the engine may be restarted immediately responsive to an increase in engine torque request.

Various approaches are provided for initiating engine start/stop function based on the presence of a vehicle operator. In one example, as shown in U.S. Patent Application 2012/0138006, Gwon et al. teaches, determining a position of a driver door and in response to the driver door being open, even if other conditions for engine idle-stop being satisfied, not initiating an engine idle-stop.

However, the inventors herein have recognized potential issues with such systems. As one example, certain vehicles may be equipped with doors which may be dis-assembled from the vehicle body by an operator during certain driving situations such as off road driving etc. In the method shown by Gwon et al., the start/stop function may not be enabled during operation of the vehicle without the presence of the door. By not stopping the vehicle during prolonged periods of engine idling, fuel consumption may increase and emission quality may reduce. Also, if the engine is auto-stopped while the driver door is detached from the vehicle body, the driver may leave the vehicle without having to open the door. In response to a request for engine power from an auxiliary device such as an air conditioner, the engine may restart and the vehicle may be undesirably propelled in the absence of the driver.

In one example, the issues described above may be addressed by a method for a vehicle comprising: detecting whether a driver side vehicle door is attached or absent, selecting a start/stop strategy for an engine propelling the vehicle based on the driver side vehicle door attachment state, and further selecting the start/stop strategy based on a type of transmission coupled between the engine and the vehicle. In this way, by detecting each of a state of attachment of a door and a presence of the driver in the vehicle, engine start/stop function may be optimized for a vehicle with detachable driver door.

As an example, a vehicle may be equipped with a door control unit (DCU) located outside the driver door. In response to idle-stop conditions being met (such as in response to a longer than threshold duration of engine idling), the DCU may detect the presence of the driver door based on an input from a switch coupled to a door connector shunt. The DCU may further detect the presence of the door by sending a signal to a window motor used for operating the driver side window coupled to the door. If it is detected that the driver door has been detached, the controller may determine if a seat belt coupled to the driver's seat is in a buckled state. If the seat belt is fastened, it may be inferred that even if the driver door is not present, the driver is at his seat and an engine idle-stop may be initiated by suspending engine combustion. During an idle-stop, in response to engine restart conditions being met, combustion may be resumed after confirmation that the seat belt is still fastened. An engine start/stop strategy may be further adjusted based on a type of transmission system (automatic transmission or manual transmission) coupled to the vehicle.

In this way, by opportunistically using the engine start/stop function in vehicles with detachable doors, fuel efficiency and emissions quality may be maintained. By detecting a state of attachment of the driver door, the idle-stop procedure may be suitably modified for a situation where the driver door has been detached. The technical effect of detecting the presence of the driver by determining a state of the driver's seat belt is that an idle-stop or an engine restart may be scheduled upon confirmation that the operator is present in the vehicle. By modifying the start/stop strategy based on vehicle transmission system, engine efficiency may be improved, in this way, the overall fuel efficiency and drive experience of the operator during engine start/stop operations may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
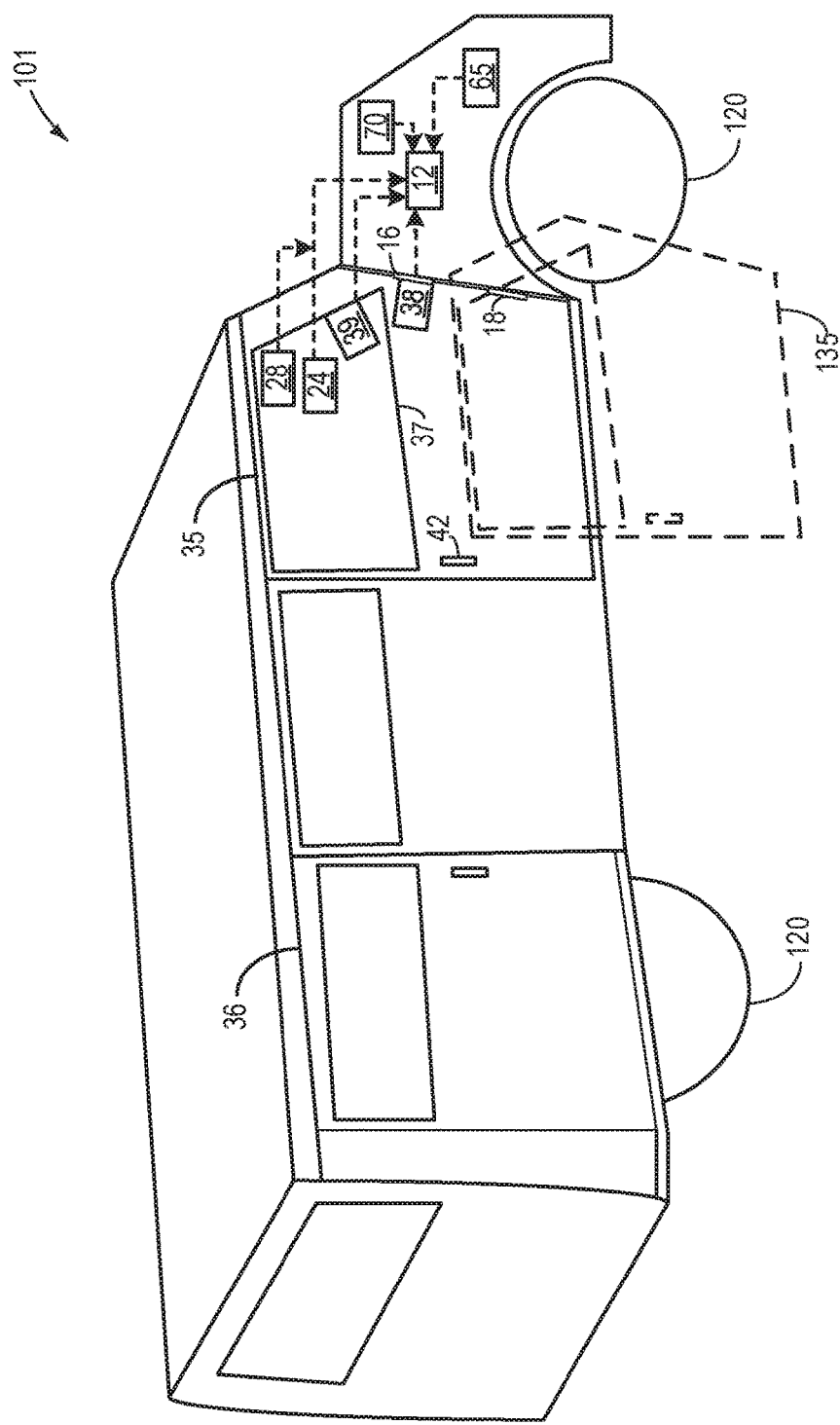
FIG. 1 shows an example vehicle system with a detachable driver side door.
Figure 2:
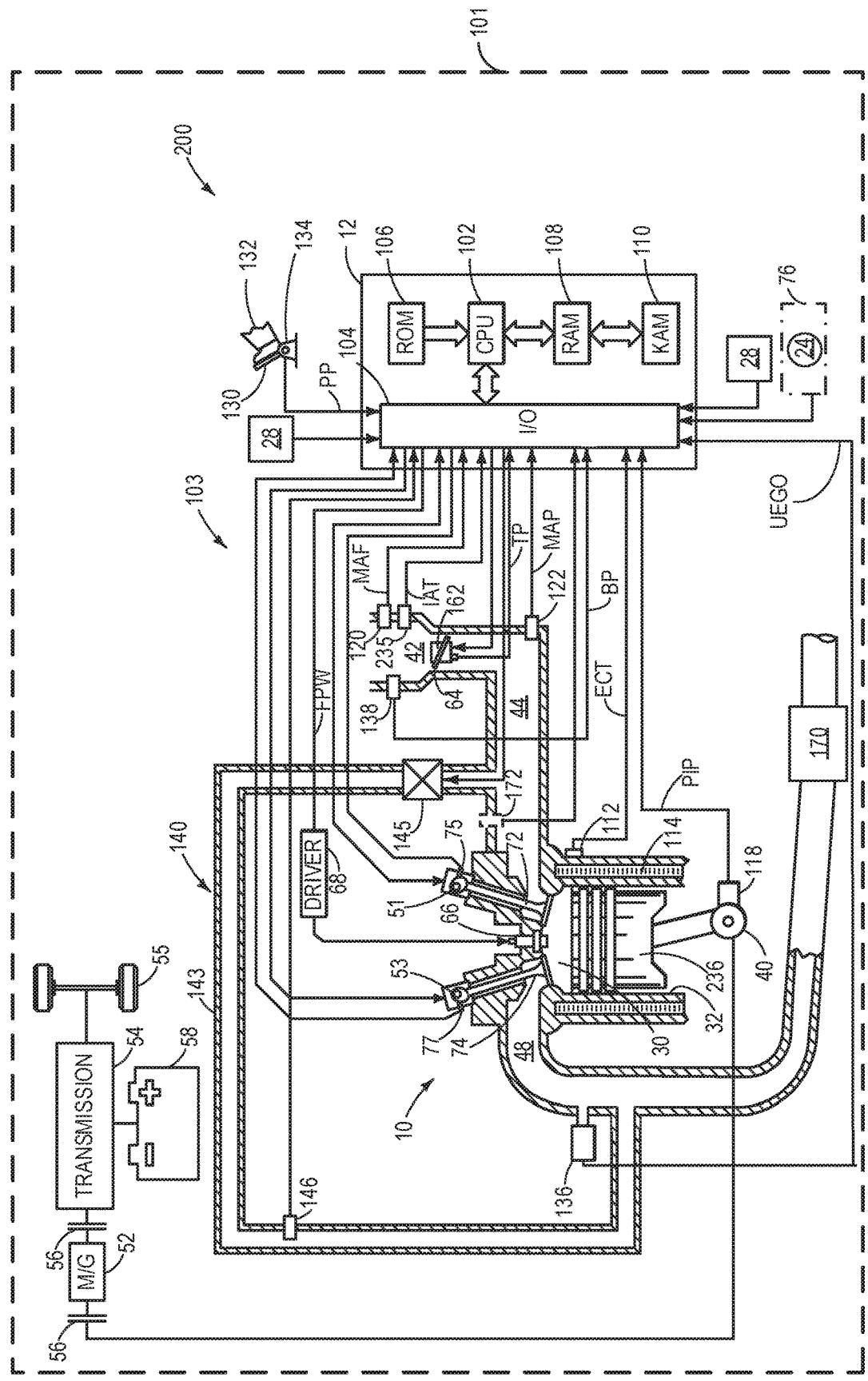
FIG. 2 shows an example engine system of the vehicle system of FIG. 1.

The following description relates to systems and methods for enabling engine start/stop function in a vehicle with a detachable driver door. An example vehicle equipped with a detachable driver side door is shown in FIG. 1 and an example engine system coupled to the vehicle is shown in FIG. 2. An engine controller may be configured to perform control routines, such as example routines of FIGS. 3 and 4, to determine a state of attachment of the driver door and to implement the engine start/stop function based on a state of attachment of the driver door. An example engine start/stop function for a vehicle with a detachable driver side is shown in FIG. 5.

FIG. 1 shows an example vehicle 101 fitted with a detachable door 35. In one example, the vehicle 101 may be a vehicle capable of being driven off-road such as on sand, mud, snow etc. In another example, vehicle 101 may be an on-road operated passenger vehicle such as a tourist coach equipped to transport passengers. The vehicle 101 may comprise wheels 55 and a vehicle cabin divided into a driver compartment and a passenger compartment. A first door 35 may be coupled to the driver compartment next to a seat on which the driver seats during operating the vehicle. A second door 36 may be coupled to the passenger compartment. In addition to the doors shown in FIG. 1, there may be additional doors to access the vehicle compartment. The first door 35 may be opened using a handle 42.

The first door 35 may be a detachable door and may be removed from the body of the vehicle. The door 35 may be coupled to the body of the vehicle via hinges 16 and 18. A door control unit (DCU) 65 may be coupled to an on-board controller 12 to facilitate removal of the door 35. In one example, the operator may indicate the intention to remove the door from the vehicle body via a switch 24. In one example, the switch 24 may be a hard switch coupled to a dashboard in the driver compartment. In another example, the switch 24 may be a soft switch that may be selected from a menu option included in a user interface. In yet another example, the switch 24 may be included in a key fob and may be activated from within or outside the vehicle 101.

A door connector shunt 38 may include an ON/OFF switch for the door 35. Based on the operator input to the HMI 24 to remove the door (referred herein as OFF condition for the door), the hinges 16 and 18 may be unlocked by the controller 12, and the door may be physically removed from the vehicle by the operator. Dashed line 135 shows an outline of the removed driver door 35. The vehicle may be driven with the driver door detached. A window 37 may be housed in the first door 35. A window pane of the window 37 may be rolled up or down via a window motor 39. When the door is detached, the window motor 39 may no longer be coupled to the vehicle body.

Engine operations may be adjusted based on a state of attachment of the first door 35. The DCU 65 may determine a state of attachment of the first door 35. In one example, the vehicle door attachment state may be estimated based on a position of the switch in the connector shunt 38 coupled to the vehicle door, the presence of the door indicated by an ON position of the switch, and the absence of the door indicated buy an OFF position of the switch. The vehicle door 35 attachment state is further confirmed based on a presence of the window motor 39 coupled to the window 37 housed in the vehicle door 35, the presence of the door 35 confirmed based on the presence of the window motor 39. The presence of the window motor 39 may be detected by passing an electric current via the window motor. A seat belt sensor 28 may be housed in the clasp of the seat belt coupled to the driver's seat. The controller 12 may estimate a state of attachment of the seat belt based on inputs from the seat belt sensor 28. Presence of the operator in the driver's seat may be further estimated based on inputs from one or more on-board cameras. Details of determination of a state of attachment of the driver side door is discussed in FIG. 3.

In addition, the vehicle 101 may include other auxiliary systems such as an air-conditioning system 70 which may use engine power during operation. During an engine idle-stop (while the engine is at rest), if the first door 35 is detached, responsive to an operator request for air-conditioning, the engine may be restarted upon confirmation that the seat belt is in a fastened position. Power from the engine may then be used to operate a compressor of the air-conditioning system 70.

FIG. 2 is a schematic diagram showing a vehicle system 200 comprising a vehicle 101 and an engine system 103. FIG. 2 shows one cylinder of a multi-cylinder engine 10 in the engine system 103. The vehicle 101 in FIG. 2 may be the mobility vehicle 101 of FIG. 1 and the engine 10 in FIG. 2 may be the engine 10 of FIG. 1. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 236 positioned therein. The piston 236 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 162 having a throttle plate 64. In this particular example, the position of throttle plate 64 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 235 and the barometric pressure (BP) sensor 138. The IAT sensor 235 estimates intake air temperature to be used in engine operations and provides a signal to the controller 12. Similarly, the BP sensor 138 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 136 is shown coupled to the exhaust passage 48 upstream of an emission control device 170. The sensor 136 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 170 is shown arranged along the exhaust passage 48 downstream of the exhaust gas sensor 136. The device 170 may be a three-way catalyst (TWC), NOx trap, various other emission control devices, or combinations thereof. In some embodiments, during operation of the engine 10, the emission control device 170 may be periodically reset by operating at least one cylinder of the engine within a particular air/fuel ratio. An oxidation catalyst (not shown) also may be included upstream of emission control device 170 and closely coupled to engine 10.

Further, an exhaust gas recirculation (EGR) system 140 may route a desired portion of exhaust gas from the exhaust passage 48 to the intake manifold 44 via an EGR passage 143. The amount of EGR provided to the intake manifold 44 may be varied by the controller 12 via an EGR valve 145. Further, an EGR sensor 146 may be arranged within the EGR passage 143 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The vehicle 101 may include a dashboard 76. A switch 24 may be coupled to the dashboard to enable the vehicle operator to request removal of the driver door. As described in relation to FIG. 1, a door connector shunt including an ON/OFF switch for the driver door may unlock the hinges attaching the door to the vehicle body. Once the hinges are unlocked, the operator may be able to physically remove the door.

During conditions when the operator torque demand decreases to below a threshold, such as when the vehicle is stopped at a traffic signal, the engine may idle until the torque demand increases. Prolonged idling may adversely affect fuel economy and emissions quality. As an example, engine idle-stop conditions may be met when a vehicle operates at a lower than threshold vehicle speed with brakes being applied.

In response to engine idle-stop conditions being met, an automatic start/stop (herein also referred to as engine idle-stop or engine start/stop) operation may be carried out to reduce the duration of engine idling. For example, if it is determined that engine idle-stop conditions are met, a first strategy may be selected for engine start/stop in response to the door being present, and a second strategy may be selected for engine start/stop in response to the door being absent, wherein the first strategy includes idle stopping the engine when the vehicle door is locked, and wherein the second strategy includes idle stopping the engine regardless of vehicle door lock condition. The second strategy may further include each of suspending engine combustion in response to each of an engine idling for longer than threshold duration and a seat belt coupled to a seat occupied by the operator during driving the vehicle being in a fastened condition, and continuing engine combustion in response to each of the engine idling for longer than threshold duration and the seat belt being in an un-fastened condition. The second strategy may further include restarting engine combustion in response to one or more of the automatic transmission system being shifted from drive, the seat belt being un-fastened, the brake pedal being released in the vehicle equipped with the automatic transmission system, and clutch pedal being engaged in the vehicle equipped with the manual transmission system. Also, in the second strategy, during suspension of engine combustion, in response to an increase in engine power demand in the vehicle equipped with the manual transmission system with the clutch pedal not engaged, the operator may be indicated to engage the clutch pedal, and engine combustion may be maintained suspended until the clutch pedal is engaged. During suspension of engine combustion, the vehicle operator may be indicated via the HMI 24. Also, during conditions when the engine idle-stops are disabled such as in response to each of the driver side vehicle door being absent and the seat-belt being in the un-fastened condition, the operator may be notified via the HMI 24. Details of execution of the engine start/stop function upon confirmation that the driver door is detached is discussed in FIG. 4.

The controller 12 is shown in FIGS. 1 and 2 is a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; absolute manifold pressure signal, MAP, from the sensor 122, vehicle angular velocity via an yaw rate sensor, and a state of a seat belt from a seat belt sensor 28. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque.

The storage medium read-only memory 106 can be programmed with computer readable data representing non-transitory instructions executable by the processor 102 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug (not shown), etc.

The controller 12 receives signals from the various sensors of FIG. 1 and employs the various actuators of FIG. 1 to adjust engine operation based on the received signals and instructions stored on a memory of the controller 12. In one example, in response to a lower than threshold engine load for a longer than threshold duration in a vehicle with the driver door attached, the controller may initiate an engine idle-stop by sending a signal to the fuel injectors 66 to suspend engine cylinder fuel injection. In another example, in response to a lower than threshold engine load for a longer than threshold duration in a vehicle with the driver door attached, the controller may confirm presence of the driver via inputs from the seat belt sensor 28 and then initiate the engine idle-stop.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. In one example, engaging the clutch includes an operator pressing on the clutch pedal with his foot and disengaging the clutch includes removing the foot form the clutch pedal. Transmission 54 may be a gearbox, a planetary gear system, or another type of transmission. The powertrain may be configured in various manners including as a parallel, a series, or a series-parallel hybrid vehicle. In one example, transmission 54 may be an automatic transmission system wherein during vehicle propulsion in forward direction, the operator may not have to manually specify the gear ratios. In an automatic transmissions system, engine power is transmitted to the wheels via a torque converter without the presence of a physical clutch pedal in the driver compartment. In another example, transmission 54 may be a manual transmission system wherein during vehicle propulsion in forward direction, the operator may manually shift the gear while engaging a clutch, the clutch pedal being present in the driver compartment.

Electric machine 52 receives electrical power from a traction battery 58 to provide torque to vehicle wheels 55. Electric machine 52 may also be operated as a generator to provide electrical power to charge traction battery 58, for example during a braking operation.

In this way, the components of FIGS. 1-2 enable a system for a hybrid vehicle system comprising: a controller with computer readable instructions stored on non-transitory memory to: estimate a state of attachment of a door of a vehicle based on a position of a switch coupled to a door connector shunt and a presence or absence of electric current flow through a motor coupled to a window housed in the door, and in response to the door being absent from a body of the vehicle and the vehicle being at rest for a longer than threshold duration, estimate a state of attachment of a seat-belt via a seat-belt sensor coupled to a buckle of the seat-belt, and selectively initiate engine idle-stop based on the state of attachment of the seat-belt and a type of transmission system coupled to the vehicle.

Figure 3:
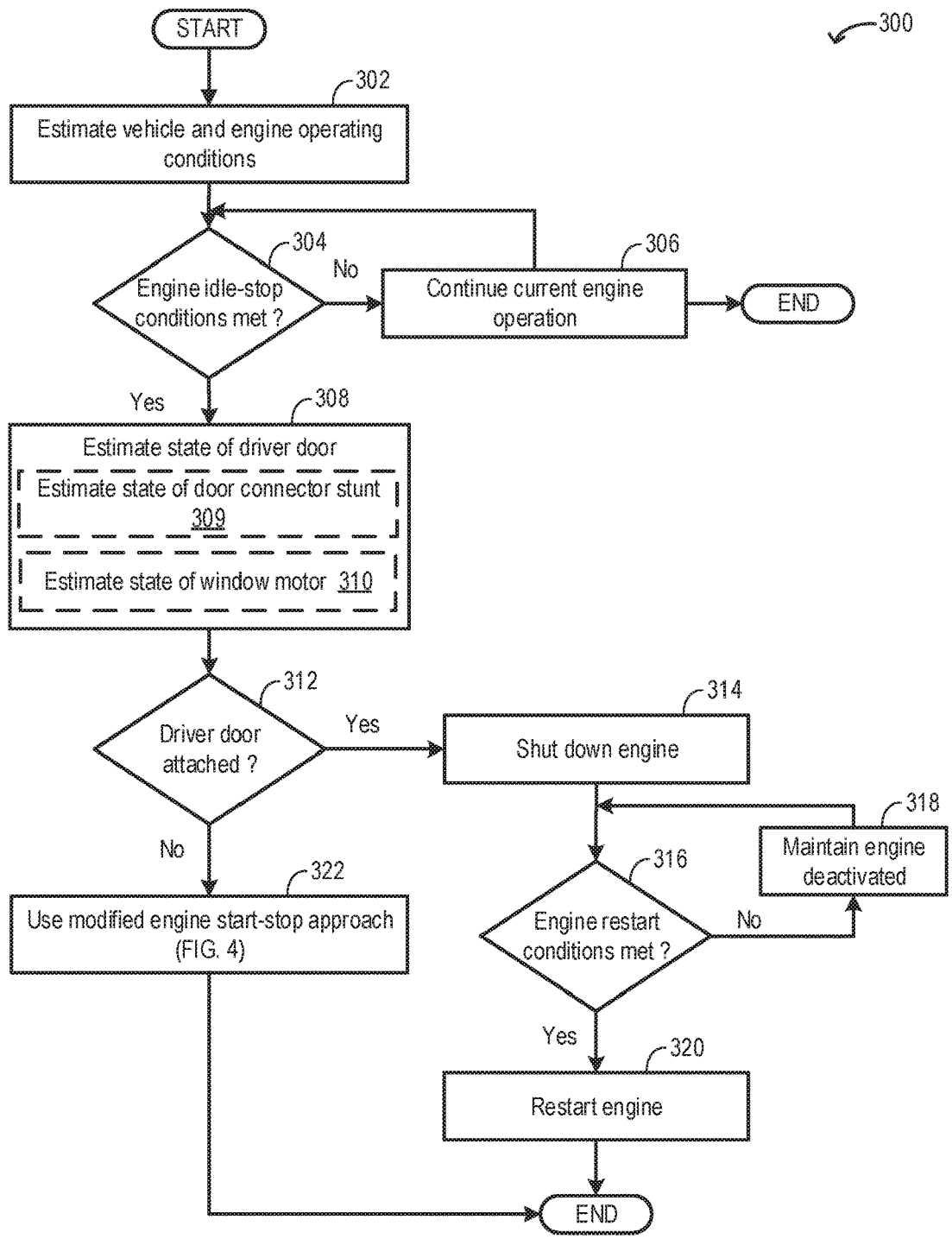
FIG. 3 shows a flow chart illustrating an example method that can be implemented to determine a state of attachment of the driver side door.

FIG. 3 shows an example method 300 for determining if a door next to the driver's seat is attached or absent, and modifying engine start/stop function based on the state of attachment of the door. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, manifold pressure, manifold air flow, battery state of charge, etc. Also, road conditions on which the vehicle is traveling may be estimated via one or more of a yaw-rate sensor and on-board cameras. In one example, the controller may determine if the vehicle is traveling on off-road conditions such as on sand, snow etc.

At 304, the routine includes determining if engine idle-stop conditions are met and if engine spin-down may be initiated. In one example, conditions for engine idle-stop may include engine idling for a longer than threshold duration. Engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. The threshold duration may be based on fuel level in the fuel tank. As an example, if the fuel level in the fuel tank is lower than a threshold level, the threshold duration may be decreased such that additional fuel may not be consumed for engine idling. In another example, conditions for engine idle-stop may include vehicle operation at a lower than threshold vehicle speed with brake being applied. Idle-stop during conditions when the vehicle speed is non-zero may be referred to as rolling idle-stop, such as when the vehicle is coasting with the operator foot off the pedal.

Engine idle-stop conditions may further include a greater than threshold battery state of charge (SOC). The controller may check battery SOC against a preset minimum threshold and if it is determined that the battery SOC is at least more that 30% charged, automatic engine stop may be enabled. Confirming engine idle-stop conditions may further include an indication that a motor of a starter/generator is operation ready. The status of an air conditioner may be checked and before initiating an engine idle-stop, it may be verified that the air conditioner did not issue a request for restarting the engine, as may be requested if air conditioning is desired. In one example, air conditioning may be desired if a temperature in the vehicle cabin increases above a desired temperature as indicated by the operator. In another example, the operator may initiate operation of the air conditioner by sending a command to the controller via a dashboard switch. The intake air temperature may be estimated and/or measured to determine if it is within a selected temperature range. In one example, the intake temperature may be estimated via a temperature sensor located in the intake manifold and an engine idle-stop may be initiated when the intake air temperature is above a threshold temperature. Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature. The driver requested torque may be estimated and confirmation of an engine idle-stop may be initiated in response to a lower than threshold driver requested torque. Further, an emission control device coupled to the exhaust manifold of engine may be analyzed to determine that no request for engine restart was made.

Engine idle-stop conditions may be based on a state of lock in the vehicle doors. The controller may detect if all the doors in the vehicle are locked and that any of the doors are not ajar. Also, engine idle-stop conditions may further depend on road conditions on which the vehicle is operating. Engine idle-stop may not be initiated if the vehicle is traveling in off-road conditions such as if the vehicle is on sand or snow. In off-road conditions, engine torque may be continuously requested due to higher torque demands as the vehicle maneuvers on uneven surfaces.

If it is determined that engine idle-stop conditions are not met, at 306, current engine operations may be continued without initiating the engine start/stop operation, such as the engine may be maintained running with cylinders combusting fuel.

If it is determined that engine idle-stop conditions are met, at 308, a state of attachment of the driver door may be estimated by a door control unit (such as DCU 65 in FIG. 1). The DCU may be a part of the vehicle control system and may be housed in the vehicle outside the driver door. The door (such as door 35 in FIG. 1) next to the driver seat (door used by the vehicle operator to enter the vehicle) may be detached from the vehicle door. The vehicle may be continued to be operated (propelled) with the door detached. Estimating the state of attachment of the driver door includes, at 309, estimating a state of a door connector shunt coupled to the driver door. A driver door ON/OFF switch may be built into the shunt. When the driver door is in a detached condition, the switch may be in OFF state and when the driver door is attached to the vehicle body, the switch may be in an ON state. Estimating the state of attachment of the door further includes, at 310, estimating a state of a motor coupled to a window housed in the driver door. If the driver door is detached, the window is also removed from the vehicle body. A window motor may be coupled to the window to facilitate motion of the window pane (rolling up and down). The DCU may send a signal (such as electric current) to the window motor to detect the presence of the motor. When the driver door is in a detached condition, since the window motor is no longer coupled to the DCU, the electric current may not flow through the window motor, and when the driver door is attached to the vehicle body, the electric current may flow through the window motor.

At 312, the routine includes determining if the driver door is attached to a body of the vehicle. The driver door may be confirmed to be attached if each of the driver door shunt connector switch is in an ON state and current may be routed through the driver side window motor. If it is determined that the driver door shunt connector switch is in an OFF state and/or current may not be routed through the driver side window motor, it may be inferred that the driver door is not attached. If the controller is unable to determine the state of attachment of the driver door (fault during door attachment state determination), such as if the shunt connector and/or the window motor is degraded, the controller may assume that the driver door is not attached and proceed with an engine start/stop suited for a situation where the driver door has been removed.

In absence of the driver door, at 322, a modified strategy may be used for engine start/stop. In the modified approach for engine start/stop, since the driver door is detached, the controller may not check if the driver door is in a locked position and may idle-stop the engine if all other conditions for engine idle-stop are being met. Details of the modified approach is discussed in FIG. 4.

In one example, for vehicles equipped with an automatic transmission system, during a driver door detached condition (also referred herein as door OFF condition), an engine may be idle-stopped only if the transmission is in drive (not in neutral, park, or reverse) and a brake pedal is engaged. As an example, engaging the brake pedal includes an operator pressing on the brake pedal with his foot and disengaging the brake pedal includes removing the foot form the brake pedal. In another example, during a driver door OFF condition, for vehicles equipped with the automatic transmission system, an engine idle-stop may be carried out if the transmission is in drive, neutral, or park. In yet another example, during a driver door OFF condition, for vehicles equipped with a manual transmission system, an engine idle-stop may be carried out only if the transmission is in neutral gear with the clutch pedal is in released condition (operator foot not pressing the clutch pedal).

If it is determined that the driver door shunt connector switch is in an ON state and current may be routed through the driver side window motor, it may be inferred that the driver door is attached. In response to the confirmation that the driver door is attached and the engine idle-stop conditions are met, at 314, combustion may be suspended to shut-down the engine. In order to suspend combustion, fueling and spark to the engine cylinders may be suspended. The controller may send a signal to one or more fuel injectors coupled to the engine cylinders to stop fuel injection to each of the cylinders. In addition, cylinder valve operation may be suspended. Once the combustion is suspended, the engine may spin-down and the engine speed may gradually decrease to zero. A message may be displayed to the vehicle operator via a human machine interface (HMI) coupled to the vehicle system (such as on the vehicle dashboard) that the engine has been idle-stopped. During engine shut-down, if the driver door is being removed, the routine may directly proceed to step 408 in FIG. 4.

At 316, the routine includes determining if engine restart conditions are met. In one example, engine idle-start (restart) conditions following an engine idle-stop may include an increase in engine load. In one example, the controller may determine if the brake pedal is released. The accelerator pedal position may also be determined, for example via a pedal position sensor, to determine whether the accelerator pedal has been engaged in addition to the release of the brake pedal. For a vehicle equipped with an automatic transmission system, a position of the transmission system may also be determined and a request for engine restart may be made if the transmission is shifted from a drive position to any other position (such as neutral, park, and reverse). For a vehicle equipped with an automatic transmission system, a position of the transmission system may also be determined and a request for engine restart may be made if a position of the gear is shifted from the neutral position to any other gear (such as $1^{st}$, $2^{nd}$, $3^{rd}$, etc.) and/or if the clutch pedal is engaged.

The status of the air conditioner may be checked to verify whether a request has been made to restart, as may be made when air conditioning is desired. The SOC of battery may be estimated to estimate if it is below a predetermined threshold. In one example, it may be desired that battery be at least 30% charged. Accordingly, engine starting may be requested to charge the battery to a desired value.

The engine restart conditions may further include, a request from an emission control device to restart the engine. In one example, the emission control device temperature may be estimated and/or measured by a temperature sensor, and if the temperature is below a predetermined threshold, an engine restart may be requested. The vehicle speed may be estimated and assessed whether it is above a predetermined threshold. For example, if the vehicle speed is greater than a threshold (e.g., 3 mph) an engine start may be requested. It may be determined whether the electrical load of the engine is above a predetermined threshold, in response to which an engine start is requested (e.g., to reduce draining of the battery). In one example, the electrical load may comprise one of various user operated accessory devices (such as a mobile phone, laptop, etc.), a defroster, windshield wipers, a music system, navigation system, electrically powered air-conditioning, etc. Further, engine restart conditions may be met if the vehicle is driven off-road and is operated on uneven surfaces such as on sand or snow which causes an increase in engine torque demand.

If it is determined that the engine restart conditions have not been met, at 318, the engine may be maintained shut down and at rest, and combustion may not be resumed. The engine may be maintained at rest until conditions for engine restart are met.

If it is determined that engine restart conditions are met, at 320, the engine may be restarted. Upon engine restart, combustion may be resumed by initiating fueling to the engine cylinders. The controller may send a signal to an actuator coupled to the starter motor to crank the engine using energy from the starter motor until an engine idling speed is reached. The on-board battery may provide energy to the starter motor. Also, the controller may send a signal to one or more fuel injectors coupled to the engine cylinders to restart fuel injection to each of the cylinders. Further, the controller may send a signal to the spark plug coupled to each cylinder to enable spark. During engine restart, the transmission position may be maintained at the current transmission position (such as drive, neutral, or reverse).

In this way, in a vehicle equipped with a manual transmission system, combusting may be suspended in one or more engine cylinders in response to each of a door being absent from a body of the vehicle, the vehicle being at rest for a longer than threshold duration, the seat-belt being in a fastened state, a gear of the transmission system being in a neutral position, and a clutch pedal coupled to the cabin being in a released condition. In a vehicle equipped with an automatic transmission system, combusting may be suspended in one or more engine cylinders in response to each of a door being absent from a body of the vehicle, the vehicle being at rest for a longer than threshold duration, the seat-belt being in a fastened state, the transmission system being in a drive position, and a brake pedal coupled to the cabin being in an engaged condition.

Figure 4:
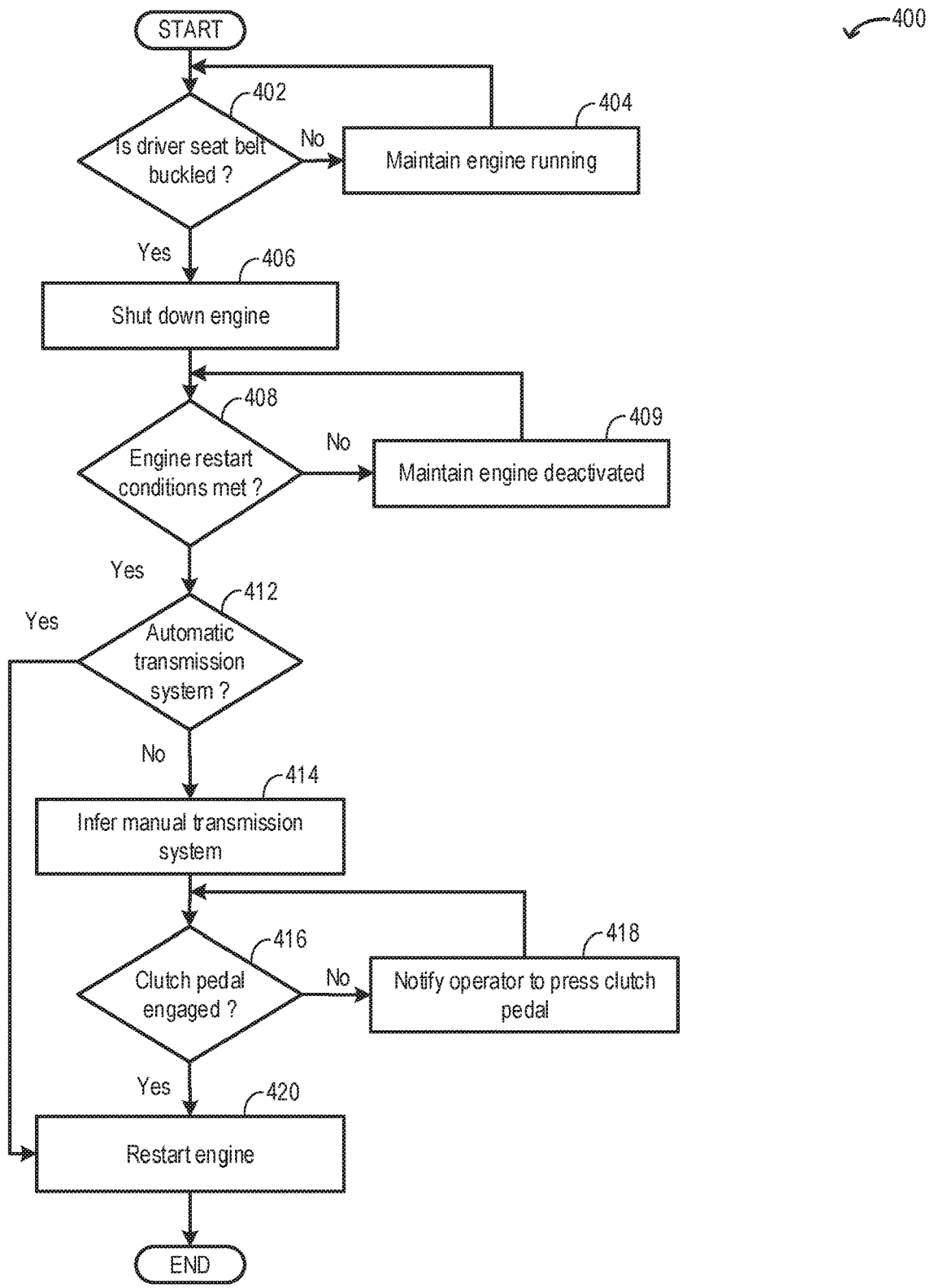
FIG. 4 shows a flow chart illustrating an example method that can be implemented for engine start/stop function.
Figure 5:
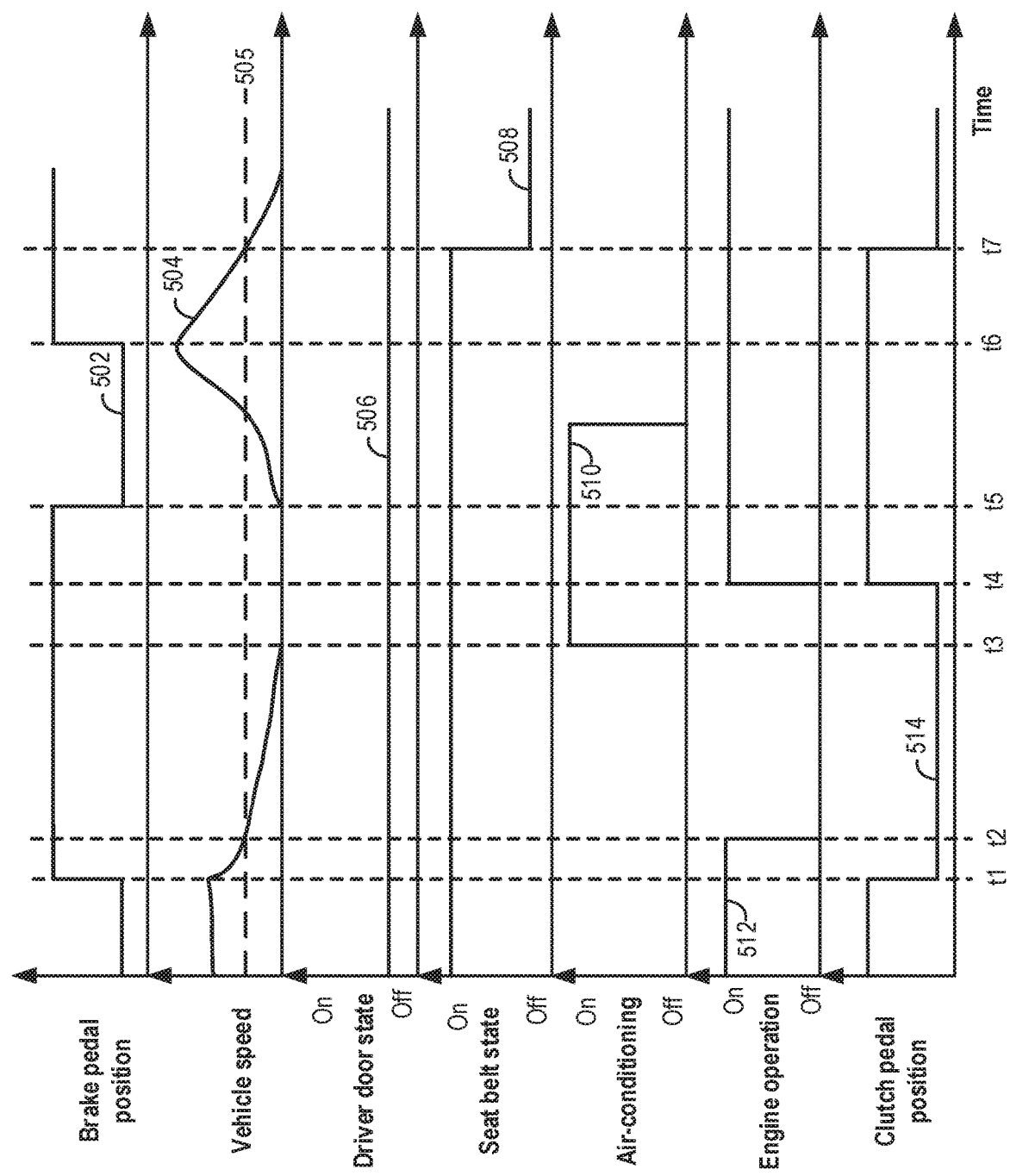
FIG. 5 shows an example engine start/stop function for a vehicle with a detachable driver door.

FIG. 4 shows an example method 400 for engine start/stop function when a driver door is detached from a vehicle. Method 400 may be part of method 300, as shown in FIG. 3, and may be carried out at step 322 of method 300. As shown in method 300, method 400 may be carried out in response to engine idle-stop conditions being met and upon confirmation that the vehicle driver door is in a detached state.

At 402, the routine includes determining if a driver seat belt is in a buckled state. The controller may estimate a state of attachment of a seat belt coupled to the driver's seat via a seat belt sensor (such as seat belt sensor 28 in FIG. 1) housed in the clasp of the driver's seat belt. The seat belt sensor may be able to detect a seat belt "ON" condition when the seat belt has been fastened, indicating presence of an operator in the driver's seat. Also, the seat belt sensor may be able to detect a seat belt "OFF" condition when the seat belt is in an un-fastened condition, indicating that an operator may not be present in the driver's seat. Presence of the operator in the driver seat may be further estimated based on inputs from one or more on-board cameras. However, even if an operator is present in the driver's seat, if the seat belt is not fastened, it may be inferred that the operator may not be ready to operate the vehicle.

If it is determined that seat belt is not buckled, it may be inferred that the operator may not be in the driver's seat and may not be able to actively operate the vehicle and/or command any changes to engine operations. Hence any change in current vehicle and engine operation may not be desired. At 404, even if engine idle-stop conditions are met, the engine may be maintained running with cylinders combusting fuel.

If it is determined that the seat belt is buckled, it may be inferred that the vehicle may be operated with the operator in the driver's seat and with the driver door in detached state. At 406, combustion may be suspended to shut-down the engine. The controller may send a signal to one or more fuel injectors coupled to the engine cylinders to stop fuel injection to each of the cylinders. Also, spark may be disabled. A message may be displayed to the vehicle operator via a human machine interface (HMI) coupled to the vehicle system (such as on the vehicle dashboard) that the engine has been idle-stopped.

At 408, the routine includes determining if engine restart conditions are met. Engine restart condition may include un-fastening of the seat-belt. If during the engine idle-stop condition, the operator un-fastens the seat belt, engine restart conditions may be met. Un-fastening of the seat belt may be taken as an indication of the operator's intention to leave the vehicle. With driver door detached (OFF), if the seat belt becomes un-buckled, the system shall automatically restart the engine such that the operator may realize that the ignition needs to be turned OFF and the vehicle may be secured before leaving the vehicle. Otherwise, there may be situation where the operator leaves the vehicle with engine auto stopped (such as if due to a malfunction engine does not restart upon brake pedal release in vehicles equipped with automatic transmissions), and then the engine restarts while the driver is away resulting in unintended vehicle movement.

In one example, if it is determined that the operator does not fasten the seat belt in more than the threshold percentage of the total number of drive cycles, un-fastening the seat-belt may not be considered as a condition for restarting the engine. Further engine restart conditions are discussed in step 316 of method 300 in FIG. 3 and the conditions are not reiterated here. If it is determined that engine restart conditions are not met, at 409, the engine may be maintained shut down, and combustion may not be resumed until engine restart conditions are met.

If it is determined that the engine restart conditions are met, at 412, the routine includes determining if the vehicle is equipped with an automatic transmission system. In an automatic transmission system, a clutch pedal is not present in the driver compartment and during vehicle drive, the gear ratio may be adjusted automatically based on engine speed and torque demand. If it is determined that the vehicle is equipped with an automatic transmission system, the routine may proceed to step 420 and the engine may be restarted by resuming fueling and spark.

If it is determined that the vehicle is not equipped with an automatic transmission system, at 414, it may be inferred that the vehicle is equipped with a manual transmission system. At 416, the routine includes determining if the clutch pedal is engaged. If the engine is restarted due to an increase in engine power demand from an auxiliary system (such as air conditioning being switched on) and not due to increased torque demand, the operator may not engage the clutch pedal. If the clutch pedal is not engaged, engine torque may not be transferred to the vehicle wheels.

If it is determined that the clutch pedal is not engaged, at 418, the operator may be notified via a message on the HMI to press the clutch pedal. By engaging the clutch pedal, engine torque may be transferred to the transmission system and the vehicle wheels. In one example, the operator may be notified via the HMI to press any pedal (such as clutch, brake, or accelerator) in order to confirm that the operator is in the vehicle when an engine restart occurs. If due to the malfunction of the seat belt sensor, it may not be possible to detect if the operator has un-buckled his seat belt and has left the vehicle, a secondary confirmation in the form of a pedal engagement may be desired before the engine is restarted. In this way, it is confirmed that the engine may not be restarted in the absence of the operator.

If it is determined that the clutch is engaged, at 420, the engine is restarted. The controller may send a signal to the fuel injectors and the spark plugs to resume fueling and spark for restarting combustion.

In this way, during operation of a vehicle with a door detached from a body of the vehicle, enabling idle-stop an engine coupled to the vehicle in response to the vehicle being at rest with a seat-belt coupled to a seat for a vehicle operator being in a fastened state, and disabling idle-stop of the engine in response to the seat-belt being unfastened. Enabling idle-stop may include suspending engine combustion by disabling fuel injection and spark to one or more engine cylinders, and disabling idle-stop may include maintaining engine combustion.

FIG. 5 shows an example operating sequence 500 illustrating implementation of engine start/stop function in a vehicle with a detachable driver door. The horizontal (x-axis) denotes time and the vertical markers t1-t7 identify significant times in operation of the vehicle with the detachable driver door.

The first plot, line 502, shows a position of a mechanical brake pedal housed in the driver compartment. The second plot, line 504, shows variation in vehicle speed over time as estimated via a wheel speed sensor. Dotted line 505 denotes a threshold vehicle speed below which engine may be shut-down. The third plot, line 506, shows a state of attachment of a driver side door as estimated via a shunt connector switch and a window motor coupled to a window in the driver door. The door may be attached to the vehicle body (On) or detached from the vehicle body (Off). The fourth plot, shows a state of attachment of a seat belt coupled to the driver's seat via a seat belt sensor. The fifth plot, line 510, shows operation of an air-conditioning system. The sixth plot, line 512, shows engine operation, specifically if the engine is combusting (On) or is shut-down (Off). The seventh plot, line 514, shows a position of a clutch pedal housed in the driver compartment in a vehicle equipped with a manual transmission system.

Prior to time t1, the brake pedal is completely disengaged, the clutch pedal is engaged, and the vehicle is operating at a vehicle speed higher than the threshold speed 505. The engine cylinder combustion is carried out to generate power used to propel the vehicle. The vehicle is operating with the driver door detached (Off). The operator is at the driver's seat with the seat belt fastened (On). At this time, the air-conditioning system is not in use (in Off state).

At time t1, the brake pedal is depressed by the operator and the clutch pedal is disengaged. In response to the change in brake pedal position, between time t1 and t2, there is a decrease in vehicle speed. At time t2, the vehicle speed has reduced to the threshold speed 505. In response to the reduction of vehicle speed to the threshold speed, at time t2, idle-stop conditions are confirmed. Upon confirmation that the seat belt is fastened, an engine idle-stop is initiated to improve fuel efficiency and emissions quality, and engine combustion is suspended. In order to initiate an idle-stop, fueling (to cylinders) is disabled, and spark is disabled. Between time t2 and t3, the vehicle speed remains below the threshold speed 505 and the engine spins down to rest, for example, the engine coasts to rest.

At time t3, the air conditioning system is switched on, thereby requesting engine power supply. In order to supply power to the air conditioning system, even when the vehicle is at rest, engine is desired to be restarted and combustion to be resumed. However, the clutch is not engaged at this time, thereby hindering engine restart from idle-stop. The operator is notified via a human machine interface (HMI) coupled to the vehicle dashboard to engage the clutch pedal. In response to the notification, at time t4, the clutch pedal is engaged and the controller restarts the engine by resuming fueling and spark. Between time t4 and t5, the engine is operated to provide power for operating the air-conditioning system while the vehicle continues to be in rest.

At time t5, the brake pedal is disengaged and the vehicle is being propelled via engine torque. Between time t5 and t6, the vehicle speed increases progressively and the engine is being operated to meet the torque demand. The air conditioning system is turned off, thereby reducing the parasitic use of engine power. At time t6, the brake pedal is depressed by the operator. In response to the change in brake pedal position, between time t6 and t7, there is a decrease in vehicle speed and at time t7, the vehicle speed has reduced to the threshold speed 505. In response to the reduction of vehicle speed to the threshold speed, at time t7, it is inferred that idle-stop conditions are met. However, at time t7, the driver seat belt is unfastened indicating that the operator may leave the vehicle once the vehicle comes to a stop. Even as the vehicle comes to complete rest (after time t7), in response to the un-fastened seat belt, the engine operation is not altered and combustion is continued.

In this way, by adjusting engine start/stop function for a vehicle quipped with removable doors, engine idle-stops may be carried out even when the driver door is detached.

The technical effect of detecting the presence of the driver by determining a state of the driver's seat belt is that an idle-stop or an engine restart may be postponed until the driver is present in the vehicle. By eliminating the possibility of engine restart and vehicle propulsion without the presence of the driver, drive experience may be improved. Overall, by continuing to carry out engine start/stop functions with the driver door in a detached position, fuel efficiency and emissions quality may be improved.

An example method for a vehicle comprises: detecting whether a driver side vehicle door is attached or absent, selecting a start/stop strategy for an engine propelling the vehicle based on the driver side vehicle door attachment state, and further selecting the start/stop strategy based on a type of transmission coupled between the engine and the vehicle. In any preceding example, additionally or optionally, the vehicle door attachment state is estimated based on a position of a switch in a connector shunt coupled to the vehicle door, the presence of the door indicated by an ON position of the switch, and the absence of the door indicated buy an OFF position of the switch. In any or all of the preceding examples, additionally or optionally, the vehicle door attachment state is further based on a presence of a window motor coupled to a window housed in the vehicle door, the presence of the door confirmed based on the presence of the window motor. In any or all of the preceding examples, additionally or optionally, the presence of the window motor is detected by passing an electric current via the window motor. In any or all of the preceding examples, additionally or optionally, the type of transmission coupled between the engine and the vehicle is an automatic transmission system and selecting the start/stop strategy based on the type of transmission includes idle-stopping an engine coupled to the vehicle when a gear of the automatic transmission system is at drive and a brake pedal is pressed by an operator. In any or all of the preceding examples, additionally or optionally, the type of transmission coupled between the engine and the vehicle is a manual transmission system and selecting the start/stop strategy based on the type of transmission includes idle-stopping an engine coupled to the vehicle when a gear of the manual transmission system is at neutral and a clutch pedal is released by the operator. In any or all of the preceding examples, additionally or optionally, selecting the engine start/stop strategy based on the driver side vehicle door attachment state includes selecting a first strategy in response to the door being present, and a second strategy in response to the door being absent, wherein the first strategy includes idle stopping the engine when the vehicle door is locked, and wherein the second strategy includes idle stopping the engine regardless of vehicle door lock condition. In any or all of the preceding examples, additionally or optionally, the second strategy further includes each of suspending engine combustion in response to each of an engine idling for longer than threshold duration and a seat belt coupled to a seat occupied by the operator during driving the vehicle being in a fastened condition, and continuing engine combustion in response to each of the engine idling for longer than threshold duration and the seat belt being in an un-fastened condition. In any or all of the preceding examples, additionally or optionally, the second strategy further includes restarting engine combustion in response to one or more of the automatic transmission system being shifted from drive, the seat belt being un-fastened, brake pedal being released in the vehicle equipped with the automatic transmission system, and clutch pedal being engaged in the vehicle equipped with the manual transmission system. In any or all of the preceding examples, additionally or optionally, the second strategy further includes, during suspension of engine combustion, in response to an increase in engine power demand in the vehicle equipped with the manual transmission system with the clutch pedal not engaged, indicating the operator to engage the clutch pedal, and maintaining engine combustion suspended until the clutch pedal is engaged. In any or all of the preceding examples, the method further comprises, additionally or optionally, indicating the operator via a human machine interface (HMI) coupled to a vehicle dashboard that engine idle-stops are disabled in response to each of the driver side vehicle door being absent and the seat-belt being in the un-fastened condition.

Another example method comprises: during operation of a vehicle with a door detached from a body of the vehicle, enabling idle-stop of an engine coupled to the vehicle in response to the vehicle being at rest with a seat-belt coupled to a seat for a vehicle operator being in a fastened state, and disabling idle-stop of the engine in response to the seat-belt being in an unfastened state. In any preceding example, additionally or optionally, enabling idle-stop includes suspending engine combustion by disabling fuel injection and spark to one or more engine cylinders, and disabling idle-stop includes maintaining engine combustion. In any or all of the preceding examples, additionally or optionally, the vehicle is equipped with an automatic transmission system, and during the idle-stop, transmission is at drive and a brake pedal is engaged. In any or all of the preceding examples, additionally or optionally, the vehicle is equipped with a manual transmission system, and during the idle-stop, a gear of the manual transmission system is at neutral with a clutch pedal in released condition. In any or all of the preceding examples, the method further comprises, additionally or optionally, detecting detachment of the door from the body based on each of an OFF position of a switch housed in a connector shunt coupled to the door and an absence of flow of electric current through a motor coupled to a window housed in the door and detecting a state of attachment of the seat-belt based on input from a seat-belt sensor coupled to a buckle of the set-belt. In any or all of the preceding examples, additionally or optionally, the door when attached to the body of the vehicle is attached to a driver cabin next to the seat for the vehicle operator.

In yet another example, a vehicle system comprises: a controller with computer readable instructions stored on non-transitory memory to: estimate a state of attachment of a door of a vehicle based on a position of a switch coupled to a door connector shunt and a presence or absence of electric current flow through a motor coupled to a window housed in the door; and in response to the door being absent from a body of the vehicle and the vehicle being at rest for a longer than threshold duration, estimate a state of attachment of a seat-belt via a seat-belt sensor coupled to a buckle of the seat-belt, and selectively initiate engine idle-stop based on the state of attachment of the seat-belt and a type of transmission system coupled to the vehicle. In any preceding example, additionally or optionally, the door is coupled to a body of the vehicle next to a seat occupied by a vehicle operator in a cabin of the vehicle and wherein the seat-belt is coupled to the seat, the seat-belt fastened to the set a via the buckle. In any or all of the preceding examples, additionally or optionally, the transmission system is a manual transmission system, and wherein selectively initiation of engine idle-stop includes, suspending combusting in one or more engine cylinders in response to each of the seat-belt being in a fastened state, a gear of the transmission system being in a neutral position, and a clutch pedal coupled to the cabin being in a released condition. In any or all of the preceding examples, additionally or optionally, the transmission system is an automatic transmission system, and wherein selectively initiate engine idle-stop includes, suspending combusting in the one or more engine cylinders in response to each of the seat-belt being in a fastened state, the transmission system being in a drive position, and a brake pedal coupled to the cabin being in an engaged condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle comprising:
 detecting whether a driver side vehicle door is attached or absent (attachment state);
 selecting a start/stop strategy for an engine propelling the vehicle based on the driver side vehicle door attachment state, including, in response to the door being attached, selecting a first strategy dependent upon a door locked state, and, in response to the door being absent, and thus detached from the vehicle body, selecting a second, different, strategy independent of the door locked state; and
 further selecting the start/stop strategy based on a type of transmission coupled between the engine and the vehicle.

2. The method of claim 1, wherein the vehicle door attachment state is estimated based on a position of a switch in a connector shunt coupled to the vehicle door, the attachment of the door indicated by an ON position of the switch and the absence of the door indicated by an OFF position of the switch.

3. The method of claim 1, wherein the vehicle door attachment state is further based on a presence of a window motor coupled to a window housed in the vehicle door, the attachment of the door confirmed based on the presence of the window motor.

4. The method of claim 3, wherein the presence of the window motor is detected by passing an electric current via the window motor.

5. The method of claim 1, wherein the type of transmission coupled between the engine and the vehicle is an automatic transmission system and selecting the start/stop strategy based on the type of transmission includes idle-stopping the engine when a gear of the automatic transmission system is at drive and a brake pedal is pressed by an operator.

6. The method of claim 5, wherein the type of transmission coupled between the engine and the vehicle is a manual transmission system and selecting the start/stop strategy based on the type of transmission includes idle-stopping the engine when a gear of the manual transmission system is at neutral and a clutch pedal is released by the operator.

7. The method of claim 6, wherein the first strategy includes idle-stopping the engine when the vehicle door is locked, and wherein the second strategy includes idle-stopping the engine regardless of the door locked state.

8. The method of claim 7, wherein the second strategy further includes each of suspending engine combustion in response to each of the engine idling for longer than a threshold duration and a seat belt coupled to a seat occupied by the operator during driving the vehicle being in a fastened condition, and continuing engine combustion in response to each of the engine idling for longer than the threshold duration and the seat belt being in an un-fastened condition.

9. The method of claim 7, wherein the second strategy further includes restarting engine combustion in response to one or more of the automatic transmission system being shifted from drive, the seat belt being un-fastened, the brake pedal being released in the vehicle equipped with the automatic transmission system, and the clutch pedal being engaged in the vehicle equipped with the manual transmission system.

10. The method of claim 7, wherein the second strategy further includes, during suspension of engine combustion, in response to an increase in engine power demand in the vehicle equipped with the manual transmission system with the clutch pedal not engaged, indicating the operator to engage the clutch pedal, and maintaining engine combustion suspended until the clutch pedal is engaged.

11. The method of claim 8, further comprising indicating the operator via a human machine interface (HMI) coupled to a vehicle dashboard that engine idle-stops are disabled in response to each of the vehicle door being absent and the seat belt being in the un-fastened condition.

12. A method, comprising:
during operation of a vehicle, and in response to determining that a door of the vehicle is detached from a vehicle body and thus absent from the vehicle, enabling idle-stop of an engine coupled to the vehicle in response to the vehicle being at rest with a seatbelt coupled to a seat for a vehicle operator being in a fastened state, and disabling idle-stop of the engine in response to the seat-belt being in an un-fastened state.

13. The method of claim 12, wherein enabling idle-stop includes suspending engine combustion by disabling fuel injection and spark to one or more engine cylinders, and wherein disabling idle-stop includes maintaining engine combustion.

14. The method of claim 12, wherein the vehicle is equipped with an automatic transmission system and, during the idle-stop, transmission is at drive and a brake pedal is engaged.

15. The method of claim 12, wherein the vehicle is equipped with a manual transmission system and, during the idle-stop, a gear of the manual transmission system is at neutral with a clutch pedal in a released condition.

16. The method of claim 12, further comprising detecting detachment of the door from the vehicle body based on each of an OFF position of a switch housed in a connector shunt coupled to the door and an absence of flow of electric current through a motor coupled to a window housed in the door and detecting a state of attachment of the seat-belt based on input from a seat-belt sensor coupled to a buckle of the set-belt, wherein the door, when attached to the vehicle body, is attached to a driver cabin next to the seat for the vehicle operator.

17. A vehicle system, comprising:
a controller with computer readable instructions stored on non-transitory memory to:
estimate a state of attachment of a door of a vehicle based on a position of a switch coupled to a door connector shunt and a presence or an absence of electric current flow through a motor coupled to a window housed in the door; and
in response to the door being absent and detached from a body of the vehicle and the vehicle being at rest for a longer than threshold duration, estimate a state of attachment of a seat-belt via a seat-belt sensor coupled to a buckle of the seat-belt, and selectively initiate engine idle-stop based on the state of attachment of the seat-belt and a type of transmission system coupled to the vehicle.

18. The system of claim 17, wherein the door is coupled to the body of the vehicle next to a seat occupied by a vehicle operator in a cabin of the vehicle and wherein the seat-belt is coupled to the seat, the seat-belt fastened to the seat via the buckle.

19. The system of claim 18, wherein the transmission system is a manual transmission system, and wherein selective initiation of engine idle-stop includes suspending combustion in one or more engine cylinders in response to each of the seat-belt being in a fastened state, a gear of the transmission system being in a neutral position, and a clutch pedal coupled to the cabin being in a released condition.

20. The system of claim 18, wherein the transmission system is an automatic transmission system, and wherein selective initiation of engine idle-stop includes suspending combustion in one or more engine cylinders in response to each of the seat-belt being in a fastened state, the automatic transmission system being in a drive position, and a brake pedal coupled to the cabin being in an engaged condition.

* * * * *